United States Patent [19]

Bernstein et al.

[11] 4,020,160

[45] Apr. 26, 1977

[54] CYCLODEXTRIN SULFATE SALTS AS COMPLEMENT INHIBITORS

[75] Inventors: Seymour Bernstein, New City, N.Y.; Joseph Peter Joseph, Cliffside Park, N.J.; Vijay Nair, Nanuet, N.Y.

[73] Assignee: American Cyanamid Company, Stamford, Conn.

[22] Filed: Aug. 15, 1975

[21] Appl. No.: 604,986

[52] U.S. Cl. ................................................ 424/180

[51] Int. Cl.[2] ...................................... A61K 31/715

[58] Field of Search .................................... 424/180

[56] References Cited

OTHER PUBLICATIONS

Hamuro et al., Chem Abst., vol. 83 (1975), p. 79544a.

*Primary Examiner*—Sam Rosen

*Attorney, Agent, or Firm*—Jack W. Richards

[57] ABSTRACT

A method of inhibiting the complement system in a body fluid containing complement with cyclodextrin sulfate salts.

7 Claims, No Drawings

CYCLODEXTRIN SULFATE SALTS AS COMPLEMENT INHIBITORS

BACKGROUND OF THE INVENTION

The present invention resides in the concept of certain cyclodextrin sulfate salts and their use as inhibitors of the complement system of warm-blooded animals.

The term "complement" refers to a complex group of proteins in body fluids that, working together with antibodies or other factors, play an important role as mediators of immune, allergic, immunochemical and/or immunopathological reactions. The reactions in which complement participates takes place in blood serum or in other body fluids, and hence are considered to be humoral reactions.

With regard to human bood, there are at present more than 11 proteins in the complement system. These complement proteins are designated by the letter C and by number: C1, C2, C3 and so on up to C9. The complement protein C1 is actually an assembly of subunits designated C1q, C1r and C1s. The numbers assigned to the complement proteins reflect the sequence in which they become active, with the exception of complement protein C4, which reacts after C1 and before C2. The numerical assignments for the proteins in the complement system were made before the reaction sequence was fully understood. A more detailed discussion of the complement system and its role in body processes can be found in, for example, *Bull. World Health Org.*, 39 935–938 (1968); *Scientific American*, 229, (No. 5), 54–66 (1973); *Medical World News*, Oct. 11, 1974, pp. 53–58; 64–66; *Harvey Lectures*, 66, 75–104 (1972); *The New England Journal of Medicine*, 287, 489–495; 545–549; 592–596; 642–646 (1972); *The John Hopkins Med. J.* 128, 57–74 (1971); and *Federation Proceedings*, 32, 134–137 (1973).

The complement system can be considered to consist of three sub-systems: (1) a recognition unit (C1q) which enables it to combine with antibody molecules that have detected a foreign invader; (2) an activation unit (C1r, C1s, C2, C4, C3), which prepares a site on the neighboring membrane; and, (3) an attack unit (C5, C6, C7, C8 and C9) which creates a "hole" in the membrane. The membrane attack unit is non-specific; it destroys invaders only because it is generated in their neighborhood. In order to minimize damage to the host's own cells, its activity must be limited in time. This limitation is accomplished partly by the spontaneous decay of activated complement and partly by interference by inhibitors and destructive enzymes. The control of complement, however, is not perfect, and there are times when damage is done to the host's cells. Immunity is therefore a double-edged sword.

Activation of the complement system also accelerates blood clotting. This action comes about by way of the complement-mediated release of a clotting factor from platelets. The biologically active complement fragments and complexes can become involved in reactions that damage the host's cells, and these pathogenic reactions can result in the development of immune-complex diseases. For example, in some forms of nephritis complement damages the basal membrane of the kidney, resulting in the escape of protein from the blood into the urine. The disease disseminated *lupus erythematosus* belongs in this category; its symptoms include nephritis, visceral lesions and skin eruptions. The treatment of diphtheria or tetanus with the injection of large amounts of antitoxin sometimes results in serum sickness, an immune-complex disease. Rheumatoid arthritis also involves immune complexes. Like disseminated *lupus erythematosus*, it is an autoimmune disease, in which the disease symptoms are caused by pathological effects of the immune system in the host's tissues. In summary, the complement system has been shown to be involved with inflamation, coagulation, fibrinolysis, antibody-antigen reactions and other metabolic processes.

In the presence of antibody-antigen complexes the complement proteins are involved in a series of reactions which may lead to irreversible membrane damage if they occur in the vicinity of biological membranes. Thus, while complement constitutes a part of the body's defense mechanism against infection, it also results in inflammation and tissue damage in the immunopathological process. The nature of certain of the complement proteins, suggestions regarding the mode of complement binding to biological membranes and the manner in which complement effects membrane damage are discussed in *Annual Review in Biochemistry*, 38, 389 (1969).

A variety of substances have been disclosed as inhibiting the complement system, i.e., as complement inhibitors. For example, the compounds 3,3'-ureylenebis-[6-(2-amino-8-hydroxy-6-sulfo-1-naphthylazo)]-benzenesulfonic acid tetrasodium salt (chlorazol fast pink), heparin and a sulphated dextran have been reported to have an anticomplementary effect, *British Journal of Experimental Pathology*, 33, 327–339 (1952). The compound 8-(3-benzamido-4-methylbenzamido)naphthalene-1,3,5-trisulphonic acid (Suramin) is described as a competitive inhibitor of the complement system, *Clin. Exp. Immunol.*, 10, 127–138 (1972). German Pat. No. 2,254,893 or South African Pat. No. 727,923 discloses certain 1-(diphenylmethyl)-4-(3-phenylallyl) piperazines useful as complement inhibitors. Other chemical compounds having complement inhibiting activity are disclosed in, for example, *Journal of Medicinal Chemistry*, 12, 415–419; 902–905; 1049–1052; 1053–1056 (1969); *Canadian Journal of Biochemistry*, 47, 547–552 (1969); *The Journal of Immunology*, 93, 629–640 (1964); *The Journal of Immunology*, 104, 279–288 (1970); *The Journal of Immunology*, 106, 241–245 (1971); and *The Journal of Immunology*, 111, 1061–1066 (1973).

It has been reported that the known complement inhibitors epsilon-aminocaproic acid, Suramin and tranexamic acid all have been used with success in the treatment of hereditary angioneurotic edema, a disease state resulting from an inherited deficiency or lack of function of the serum inhibitor of the activated first component of complement (C1 inhibitor), *The New England Journal of Medicine*, 286, 808–812 (1972); *Allergol, Et. Immunopath*, II, 163–168 (1974); and *J. Allergy Clin. Immunol.*, 53, No. 5, 298–302 (1974).

SUMMARY OF THE INVENTION

It has now been discovered that certain cyclodextrin sulfate salts interact with the complement reaction sequence, thereby inhibiting complement activity in body fluids.

This invention is particularly concerned with all pharmaceutically acceptable cyclohextrin polysulfate salts having complement inhibiting activity. Representative cyclodextrin sulfates salts within the scope of the present invention, include, for example: α-cyclodextrin polysulfate triethylammonium salt; α-cyclodextrin polysulfate sodium salt; α-cyclodextrin polysulfate potassium salt: β-cyclodextrin polysulfate triethylammonium salt; β-cyclodextrin polysulfate sodium salt; β-cyclodextrin polysulfate potassium salt; γ-cyclodextrin polysulfate triethylammonium salt; γ-cyclodextrin polysulfate sodium salt; and γ-cyclodextrin polysulfate potassium salt.

Operable pharmaceutically acceptable cyclodextrin sulfate salts encompassed within this invention include the salts of alkali metal salts, alkaline earth metal salts, ammonium and substituted ammonias, e.g., ammonium, diethanolamine, ethylenediamine,, glucamine, trialkylammonium (e.g., $C_1$–$C_6$ alkyl), pyridinium, etc.

The cyclodextrin polysulfates of this invention may be prepared by dissolving the cyclodextrin and the sulfating agent in a solvent such as dimethylformamide, hexamethylphosphoramide or dimethylsulfoxide with heating at 40°–80° for a period of 6 to 24 hours. The molecular ratio of sulfating agent, e.g., trialkylammonium sulfur trioxide or pyridinium sulfur trioxide, to the number of hydroxyl groups on the cyclodextrin determines the degree of sulfation. For complete sulfation an excess of sulfating reagent is used. The product can be isolated by adding a solvent such as acetone or methylene chloride and ether, and the residue triturated with acetone or ether. The trialkylammonium or pyridinium sulfates of cyclodextrin can be converted to the alkali metal or ammonium salts by treatment with proper inorganic reagents such as sodium or potassium acetate or hydroxide in aqueous alcohol at room temperature or below as described in U.S. Pat. No. 2,923,704. The cyclodextrin sulfates of this invention may also be prepared from chlorosulfonic acid and sodium acetate as described in U.S. Pat. No. 2,923,704.

Certain cycloamylose sulfates (or cyclodextrin sulfates), salts thereof, and their use in the clearing of lipemic plasma in the treatment of coronary diseases are disclosed in U.S. Pat. No. 2,923,704. However, no complement inhibiting properties are disclosed for such compounds.

This invention is concerned with a method of inhibiting the complement system in a body fluid, such as blood serum, which comprises subjecting body fluid complement to the action of an effective complement inhibiting amount of a cyclodextrin polysulfate salt. The method of use aspect of this invention is also concerned with a method of inhibiting the complement system in a warm-blooded animal which comprises internally administering to said animal an effective complement inhibiting amount of a cyclodextrin polysulfate salt. Body fluid can include blood, plasma, serum, synovial fluid, cerebrospinal fluid, or pathological accumulations of fluid such as pleural effusion, etc.

The cyclodextrin sulfates of the present invention find utility as complement inhibitors in body fluids and as such may be used to ameliorate or prevent those pathological reactions requiring the function of complement and in the therapeutic treatment of warm-blooded animals having immunologic diseases such as rheumatoid arthritis, systemic lupus erythematosus, certain kinds of glomerulonephritis, certain kinds of auto-allergic hemolytic anemia, certain kinds of platelet disorders and certain kinds of vaculitis. The cyclodextrin sulfates herein may also be used in the therapeutic treatment of warm-blooded animals having non-immunologic diseases such as paroxysmal nocturnal hemoglobinuria, hereditary angioneurotic edema (treated with Suramin, etc.) and inflammatory states induced by the action of bacterial or lysosomal enzymes on the appropriate complement components as for example, inflammation following coronary occlusion. They may also be useful in the treatment of transplant rejection.

DETAILED DESCRIPTION OF THE INVENTION

The following examples describe in detail the preparation and formulation of representative compounds of the present invention.

EXAMPLE 1

α-Cyclodextrin polysulfate triethylammonium salt

A 0.05 portion of α-cyclodextrin and 1.68 g. of triethylamine-sulfur trioxide are dissolved in 5 ml. of dimethylformamide. The solution is heated with stirring in an oil bath at 50°–60° C. for 24 hours. The solution is concentrated in vacuo and anhydrous ether is added. The resulting gum which precipitates is separated and washed twice with ether. After dissolving in methylene chloride the solution is filtered and evaporated in vacuo to leave a clear gum. This material is triturated twice with acetone and again taken to dryness in vacuo to a clear gum.

EXAMPLE 2

α-Cyclodextrin polysulfate sodium salt

A 10.0 g portion of α-cyclodextrin and 40.6 g of triethylamine-sulfur trioxide are dissolved in 50 ml of dimethylformamide. The solution is heated in an oil-bath at 70°–80° C for 24 hours with stirring and is then poured into 500 ml of acetone. A gum separates. The acetone is decanted and the gum is triturated with fresh acetone which is also decanted. The residue is dissolved in methanol, filtered, and evaporated. It is then dissolved in 125 ml of water and 50 ml of 30% aqueous sodium acetate and poured with stirring into 600 ml of ethanol. The ethanol is decanted from the oil which separates and the oil is redisolved in 200 ml of water and 20 ml of 30% aqeuous sodium acetate solution and poured into 2 liters of ethanol. The white flocculent solid which separates is collected, washed with ethanol and dried in vacuo over phosphorous pentoxide at 78° C.

EXAMPLE 3

β-Cyclodextrin polysulfate triethylammonium salt

A 1.0 g portion of β-cyclodextrin and 3.36 g of triethylamine-sulfur trioxide are dissolved in 5 ml of dimethylformamide. The solution is stirred for 24 hours at 50°–60° and then poured into acetone. A white gum results. The acetone is decanted from the gum which is triturated twice with acetone and dried in vacuo. The gum solidifies to give a white amorphous solid.

EXAMPLE 4

β-Cyclodextrin polysulfate sodium salt

A 10.0 g portion of β-cyclodextrin and 40.6 g of triethylamine-sulfur trixode is dissolved in 50 ml of dimethylformamide. The solution is heated in an oil-bath at 70°–80° C with stirring for 24 hours and then poured into 500 ml of acetone. A gum separates. The acetone is decanted and the gum is dissolved in methanol, filtered and evaporated in vacuo. The clear residue is dissolved in 100 ml of water and 50 ml of 30% aqueous sodium acetate is added and the solution is poured into 1 liter of ethanol. The white solid which separates is collected by filtration, washed with ethanol and air dried. The solid is dissolved in 250 ml of water and 25 ml of 30% sodium acetate, filtered, and poured with stirring into 1200 ml of ethanol. The white solid is collected by filtration, washed with ethanol, and dried in vacuo at 78° C over phosphorous pentoxide, giving a white solid.

EXAMPLE 5

β-Cyclodextrin polysulfate sodium salt

In 13 ml of cold (0°–5° C) pyridine a 2.2 ml portion of chlorosulfonic acid is added dropwise with rapid stirring. The temperature is maintained at 0°–5° C. The mixture is warmed to 75°–80° C in an oil bath and 560 mg of β-cyclodextrin is added and heated at 80°–85° C for 4 hours. The mixture is poured into 600 ml of methanol with stirring and the while solid which precipitates is collected by filtration, washed with methanol and air dried. This is dissolved in 10 ml of water and 5 ml of 30% aqueous sodium acetate and poured with stirring into 100 ml of ethanol. The resulting solid is air dried and redissolved and reprecipitated from the same solvents. There is collected a white solid.

EXAMPLE 6

β-Cyclodextrin polysulfate potassium salt

In 10 ml of methanol there is dissolved 1.0 g of β-cyclodextrin polysulfate triethylammonium salt and to this is added 1N potassium hydroxide in methanol until no further precipitation occurs. The white solid which is collected by filtration is washed with methanol and dried overnight at 30° C. in vacuo.

EXAMPLE 7

Preparation of Compressed Tablet

| | mg/tablet |
|---|---|
| α-Cyclodextrin polysulfate triethylammonium salt | 0.5–500 |
| Dibasic Calcium Phosphate NF | qs |
| Starch USP | 40 |
| Modified Starch | 10 |
| Magnesium Stearate USP | 1–5 |

EXAMPLE 8

Preparation of Compressed Tablet-Sustained Action

| | mg/tablet |
|---|---|
| α-Cyclodextrin polysulfate sodium salt as Aluminum Lake,* Micronized | 0.5–500 as acid equivalent |
| Dibasic Calcium Phosphate NF | qs |
| Alginic Acid | 20 |
| Starch USP | 35 |
| Magnesium Stearate USP | 1–10 |

*Complement inhibitor as sodium salt + $Al_2(SO_4)_3$ ⟶ Al Complement inhibitor + $Na_2SO_4$. Complement inhibitor content in Aluminum Lake ranges from 5–30%.

EXAMPLE 9

Preparation of Hard Shell Capsule

| | mg/tablet |
|---|---|
| β-Cyclodextrin polysulfate triethylammonium salt | 0.5–500 |
| Lactose Spray Dried | qs |
| Magnesium Stearate | 1–10 |

EXAMPLE 10

Preparation of Oral Liquid (Syrup)

| | % w/v |
|---|---|
| β-Cyclodextrin polysulfate sodium salt | 0.05–5 |
| Liquid Sugar | 75.0 |
| Methyl Paraben USP | 0.18 |
| Propyl Paraben USP | 0.02 |
| Flavoring Agent | qs |
| Purified Water qs ad | 100.0 |

EXAMPLE 11

Preparation of Oral Liquid (Elixir)

| | % w/v |
|---|---|
| β-Cyclodextrin polysulfate sodium salt | 0.05–5 |
| Alcohol USP | 12.5 |
| Glycerin USP | 45.0 |
| Syrup USP | 20.0 |
| Flavoring Agent | qs |
| Purified Water qs ad | 100.0 |

EXAMPLE 12

Preparation of Oral Suspension (Syrup)

| | % w/v |
|---|---|
| β-Cyclodextrin polysulfate potassium salt as Aluminum Lake, Micronized | 0.05–5 (acid equivalent) |
| Polysorbate 80 USP | 0.1 |
| Magnesium Aluminum Silicate, Colloidal | 0.3 |
| Flavoring Agent | qs |
| Methyl Paraben USP | 0.18 |
| Propyl paraben USP | 0.02 |
| Liquid Sugar | 75.0 |
| Purified Water qs ad | 100.0 |

EXAMPLE 13

Preparation of Injectable Solution

| | % w/v |
|---|---|
| α-Cyclodextrin polysulfate sodium salt | 0.05–5 |
| Benzyl alcohol N.F. | 0.9 |
| Water for Injection qs ad | 100.0 |

EXAMPLE 14

| Preparation of Injectable Oil | |
|---|---|
| | % w/v |
| $\beta$-Cyclodextrin polysulfate sodium salt | 0.05-5 |
| Benzyl Alchol | 1.5 |
| Sesame Oil qs ad | 100.0 |

EXAMPLE 15

| Preparation of Injectable Depo-Suspension | |
|---|---|
| | % w/v |
| $\alpha$-Cyclodextrin polysulfate sodium salt as Aluminum Lake Micronized | 0.05-5 (acid equivalent) |
| Polysorbate 80 USP | 0.2 |
| Polyethylene Glycol 4000 USP | 3.0 |
| Sodium Chloride USP | 0.8 |
| Benzyl Alcohol N.F. | 0.9 |
| HCl to pH 6-8 | qs |
| Water for Injection qs ad | 100.0 |

The cyclodextrin sulfate salts of this invention may be administered internally, e.g., orally or parenterally, e.g., intra-articularly, to a warm-blooded animal to inhibit complement in the body fluid of the animal, such inhibition being useful in the amelioration or prevention of those reactions dependent upon the function of complement, such as inflammatory process and cell membrane damage induced by antigen-antibody complexes. A range of doses may be employed depending on the mode of administration, the condition being treated and the particular cyclodextrin sulfate salt being used. For example, for intravenous or subcutaneous use from about 5 to about 50 mg/kg/day, or every 6 hours for more rapidly excreted salts, may be used. For intra-articular use for large joints such as the knee, from about 2 to about 20 mg/joint per week may be used, with proportionally smaller doses for smaller joints. The dosage range is to be adjusted to provide optimum therapeutic response in the warm-blooded animal being treated. In general, the amount of cyclodextrin sulfate salt administered can vary over a wide range to provide from about 5 mg/kg/ to about 100 mg/kg of body weight of animal per day. The usual daily dosage for a 70 kg subject may vary from about 350 mg to about 3.5 g. Unit doses of the salt can contain from about 0.5 mg to about 500 mg.

In therapeutic use the compounds of this invention may be administered in the form of conventional pharmaceutical compositions. Such compositions may be formulated so as to be suitable for oral or parenteral administration. The active ingredient may be combined in admixture with a pharmaceutically acceptabie carrier, which carrier may take a wide variety of forms depending on the form of preparation desired for administration, i.e., oral or parenteral. The componds can be used in compositions such as tablets. Here, the principal active ingredient is mixed with conventional tableting ingredients such as corn starch, lactose, sucrose, sorbitol, talc, stearic acid, magnesium stearate, dicalcium phosphate, gums, or similar materials as non-toxic pharmaceutically acceptable diluents or carriers. The tablets or pills of the novel compositions can be laminated or otherwise compounded to provide a dosage form affording the advantage of prolonged or delayed action or predetermined successive action of the enclosed medication. For example, the tablet or pill can comprise an inner dosage and an outer dosage component, the latter being in the form of an envelope over the former. The two components can be separated by an enteric layer which serves to resist disintegration in the stomach and permits the inner component to pass intact into the duodenum or to be delayed in release. A variety of materials can be used for such enteric layers or coatings, such materials including a number of polymeric acids or mixtures of polymeric acids with such materials as shellac, shellac and cetyl alcohol, cellulose acetate and the like. A particularly advantageous enteric coating comprises a styrene maleic acid copolymer together with known materials contributing to the enteric properties of the coating. The tablet or pill may be colored through the use of an appropriate non-toxic dye, so as to provide a pleasing appearance.

The liquid forms in which the novel compositions of the present invention may be incorporated for administration include suitable flavored emulsions with edible oils, such as, cottonseed oil, sesame oil, coconut oil, peanut oil, and the like, as well as elixirs and similar pharmaceutical vehicles. Sterile suspensions or solutions can be prepared for parenteral use. Isotonic preparations containing suitable preservatives are also desirable for injection use.

The term dosage form as described herein refers to physically discrete units suitable as unitary dosage for warm-blooded animal subjects, each unit containing a predetermined quantitiy of active component calculated to produce the desired therapeutic effect in association with the required pharmaceutical diluent, carrier or vehicle. The specification for the novel dosage forms of this invention are indicated by characteristics of the active component and the particular therapeutic effect to be achieved or the limitations inherent in the art of compounding such an active component for therapeutic use in warm-blooded animals as disclosed in this specification. Examples of suitable oral dosage forms in accord with this invention are tablets, capsules, pills, powder packets, granules, wafers, cachets, teaspoonfuls, dropperfuls, ampules, vials, segregated multiples of any of the foregoing and other forms as herein described.

The complment inhibiting activity of the compounds of this invention has been demonstrated by one or more of the following identified tests: (i) Test, Code 026 (C1 inhibitor). This test measures the ability of activated human C1 to destroy fluid phase human C2 in the presence of C4 and appropriate dilutions of the test compound. An active inhibitor protects C2 from C1 and C4; (ii) Test, Code 035 (C3-C9 inhibitor) — This test determines the ability of the late components of human complement (C3-C9) to lyse EAC 142 in the presence of appropriate dilutions of the test compound. An active inhibitor protects EAC 142 from lysis by human C3-C9; (iii) Test, Code 036 (C-Shunt inhibitor)-In this test human erythrocytes rendered fragile are lysed in autologous serum via the shunt pathway activated by cobra venom factor in the presence of appropriate dilutions of the test compound. Inhibition of the shunt pathway results in failure of lysis; (iv) Forssman Vasculitis Test — Here, the well known complement dependent lesion, Forssman vasculitis, is produced in guinea pigs by intradermal injection of rabbit anti-Forssman antiserum. The lesion is measured in terms of diameter, edema and hemorrhage and the extent to which a combined index of these is inhibited by prior intraperitoneal injection of the test compound at 200 mg/kg is then reported, unless otherwise stated; (v) Forssman Shock Test — Lethal shock is produced in guinea pigs by an i.v. injection of anti-Forssman antiserum and the harmonic mean death time of treated guinea pigs is compared with that of simultaneous controls; (vi) Complement Level Reduction Test — In this test, the above dosed guinea pigs, or others, are bled for serum and the complement level is determined in undiluted serum by the capillary tube method of U.S. Pat. No. 3,876,376 and compared to undosed control guinea pigs; and (vii) Cap 50 Test — Here, appropriate amounts of the test compound are added to a pool of guinea pig serum in vitro, after which the undiluted serum capillary tube assay referred to above is run. The concentration of compound inhibiting 50% is reported.

With reference to Table I, guinea pigs weighing about 300 g were dosed intravenously (i.v.) or intraperitoneally (i.p.) with 200 mg/kg of the test compound dissolved in saline and adjusted to pH 7–8. One hour after dosing, the guinea pigs were decapitated, blood was collected and the serum separated. The serum was tested for whole complement using the capillary tube assay. Percent inhibition was calculated by comparison with simultaneous controls. The results appear in Table I together with results of tests, code 026, 035, 036, Cap 50, % inhibition and Forssman shock. Table I shows that the compounds of the invention possess highly significant in situ and in vivo, complement inhibiting activity in warm-blooded animals.

TABLE I

Biological Activities

| Compound | In Vitro Activity 026* | 035* | 036* | Cap 50* | In vivo Activity (Guinea Pig) % Inhibition 100 mg/kg i.v. Time 2′ | 30′ | 120′ | 200 mg/kg i.p. Time 30′ | 60′ | 120′ | Forsmann Shock at 200 mg/kg (Harmonic mean death time (Control=3.15 min) |
|---|---|---|---|---|---|---|---|---|---|---|---|
| α-Cyclodextrin polysulfate | | | | | | | | | | | |
| triethylammonium salt | 11** | Neg | 3 | | | | | | | | |
| triethylammonium salt | 11 | Neg | 5 | | | | | | | | |
| sodium salt | 14 | Neg | 6 | <100 | 75 | 56 | 39 | 71 | 28 | 72 | 31.1 min |
| β-Cyclodextrin polysulfate | | | | | | | | | | | |
| triethylammonium salt | 10 | Neg | 4 | 200 | | | | | | | |
| | 10 | Neg | 6 | | | | | | | | |
| potassium salt | 10 | Neg | 6 | 100 | | | | | | | |
| sodium salt | 12 | Neg | 4 | | | | | | | | |
| sodium salt | 11 | 1 | 5 | 132 | | | | | | | |
| sodium salt | 10 | 1 | 1 | 231 | 75 | 45 | 27 | 49 | 29 | 67 | >90 min |

*Code designations for tests employed as referred to herein.
**11 = activity 11 wells, a serial dilution assay; higher well number indicates higher activity. The serial dilutions are two-fold.

We claim:

1. A method of inhibiting the complement system in a warm-blooded animal in need of such therapy which comprises internally administering to said animal an effect complement inhibiting amount of a pharmaceutically acceptable cyclodextrin polysulfate salt.

2. A method according to claim 1 wherein the salt is administered intra-articularly.

3. A method according to claim 1 wherein the salt is α-cyclodextrin polysulfate triethylammonium salt.

4. A method according to claim 1 whereinn the salt is α-cyclodextrin polysulfate sodium salt.

5. A method according to claim 1 wherein the salt is β-cyclodextrin polysulfate triethylammonium salt.

6. A method according to claim 8 wherein the salt is β-cyclodextrin polysulfate sodium salt.

7. A method according to claim 1 wherein the salt is β-cyclodextrin polysulfate potassium salt.

* * * * *

UNITED STATES PATENT OFFICE
CERTIFICATE OF CORRECTION

Patent No. 4020160 Dated April 26, 1977

Inventor(s) Seymour Bernstein, Joseph Peter Joseph, Vijay Nair

It is certified that error appears in the above-identified patent and that said Letters Patent are hereby corrected as shown below:

Claim 4, line 1, change "whereinn" to --wherein--.

Claim 6, line 1, change "8" to --1--.

Signed and Sealed this

*fifth* Day of *July 1977*

[SEAL]

*Attest:*

RUTH C. MASON
*Attesting Officer*

C. MARSHALL DANN
*Commissioner of Patents and Trademarks*